(12) United States Patent
Pursifull (10) Patent No.: US 8,118,006 B2
(45) Date of Patent: Feb. 21, 2012

(54) FUEL INJECTOR DIAGNOSTIC FOR DUAL FUEL ENGINE

(75) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/756,838

(22) Filed: Apr. 8, 2010

(65) Prior Publication Data
US 2011/0132321 A1   Jun. 9, 2011

(51) Int. Cl.
F02B 3/00 (2006.01)
F02B 13/00 (2006.01)
F02M 31/00 (2006.01)
F02M 51/00 (2006.01)

(52) U.S. Cl. ......... 123/299; 123/478; 123/575; 123/456

(58) Field of Classification Search .......... 701/101–105; 123/1 A, 72, 196 R, 198 D, 198 F, 198 DB, 123/299, 321, 322, 332, 478, 525, 575, 577, 123/300, 304, 456, 526, 27 GE
See application file for complete search history.

(56) References Cited

U.S. PATENT DOCUMENTS

| | | | |
|---|---|---|---|
| 5,176,122 A | 1/1993 | Ito | |
| 5,224,452 A | 7/1993 | Tomizawa | |
| 5,372,411 A | 12/1994 | Gerstenmaier et al. | |
| 5,445,019 A | 8/1995 | Glidewell et al. | |
| 5,526,797 A | 6/1996 | Stokes | |
| 5,528,901 A * | 6/1996 | Willis | 60/626 |
| 5,542,394 A | 8/1996 | Tomisawa | |
| 5,633,458 A | 5/1997 | Pauli et al. | |
| 5,682,864 A | 11/1997 | Shirakawa | |
| 5,740,667 A | 4/1998 | Bhattacharyya et al. | |
| 5,762,366 A | 6/1998 | Faye | |
| 5,857,445 A | 1/1999 | Shimada et al. | |
| 5,964,088 A * | 10/1999 | Kinugasa et al. | 60/286 |
| 6,024,069 A | 2/2000 | Yoshino | |
| 6,047,542 A * | 4/2000 | Kinugasa et al. | 60/274 |
| 6,058,906 A | 5/2000 | Yoshino | |
| 6,088,647 A | 7/2000 | Hemberger et al. | |

(Continued)

FOREIGN PATENT DOCUMENTS

EP   2 048 339 A1   4/2009

OTHER PUBLICATIONS

Leone, Thomas G., et al., "Method for Operating a Charge Diluted Engine" U.S. Appl. No. 12/756,822, filed Apr. 8, 2010, 87 Pgs.

(Continued)

*Primary Examiner* — Willis Wolfe, Jr.
*Assistant Examiner* — Johnny Hoang
(74) *Attorney, Agent, or Firm* — Allan J. Lippa; Alleman Hall McCoy Russell & Tuttle LLP (57) ABSTRACT

Various systems and methods are described for controlling fuel injection of a dual fuel engine which includes first and second fuel rails and first and second fuel pumps. In one example, while pumping is suspended in the second fuel rail, the first fuel is injected to all but one cylinder of the engine and the second fuel is injected to the one cylinder in a predetermined sequence. As such, the fuel injector injecting to the one cylinder is isolated and its performance may be assessed without significantly affecting engine performance.

20 Claims, 7 Drawing Sheets

U.S. PATENT DOCUMENTS

| | | | |
|---|---|---|---|
| 6,176,215 B1 | 1/2001 | Baur et al. | |
| 6,213,104 B1 | 4/2001 | Ishikirlyama et al. | |
| 6,244,043 B1 * | 6/2001 | Farmer et al. | 60/274 |
| 6,247,449 B1 | 6/2001 | Persson | |
| 6,289,672 B1 * | 9/2001 | Katoh et al. | 60/285 |
| 6,318,306 B1 | 11/2001 | Komatsu | |
| 6,334,424 B1 | 1/2002 | Ito | |
| 6,336,320 B1 * | 1/2002 | Tanaka et al. | 60/285 |
| 6,349,702 B1 | 2/2002 | Nishiyama | |
| 6,390,030 B1 | 5/2002 | Isogawa et al. | |
| 6,536,209 B2 * | 3/2003 | Fluga et al. | 60/284 |
| 6,591,817 B2 | 7/2003 | Deutsch | |
| 6,666,020 B2 * | 12/2003 | Tonetti et al. | 60/286 |
| 6,705,295 B1 | 3/2004 | Tarroux et al. | |
| 6,711,893 B2 | 3/2004 | Ueda et al. | |
| 6,729,301 B2 | 5/2004 | Nakamori et al. | |
| 6,751,543 B2 | 6/2004 | Gras et al. | |
| 6,843,055 B2 * | 1/2005 | Ootake | 60/297 |
| 6,851,398 B2 | 2/2005 | Taylor, III et al. | |
| 6,872,365 B1 * | 3/2005 | Boegner et al. | 422/174 |
| 6,964,261 B2 | 11/2005 | Warne et al. | |
| 6,988,481 B2 | 1/2006 | Sen et al. | |
| 6,990,956 B2 | 1/2006 | Niimi | |
| 6,997,142 B2 | 2/2006 | Wakao et al. | |
| 7,017,339 B2 * | 3/2006 | Konstantakopoulos et al. | 60/323 |
| 7,047,940 B2 | 5/2006 | Niimi | |
| 7,089,888 B2 | 8/2006 | Mirji | |
| 7,104,244 B2 | 9/2006 | Nishi et al. | |
| 7,159,541 B2 | 1/2007 | Wakao et al. | |
| 7,203,579 B2 | 4/2007 | Yokota et al. | |
| 7,216,480 B2 * | 5/2007 | Suzuki et al. | 60/285 |
| 7,228,841 B2 | 6/2007 | Takemoto et al. | |
| 7,261,065 B2 | 8/2007 | Aimoto et al. | |
| 7,370,609 B2 | 5/2008 | Kamio | |
| 7,454,898 B2 | 11/2008 | Allgeier et al. | |
| 7,523,744 B2 | 4/2009 | Ayame | |
| 7,530,335 B2 | 5/2009 | Sakurai et al. | |
| 2001/0003977 A1 | 6/2001 | Hayashi et al. | |
| 2004/0139944 A1 | 7/2004 | Nakano et al. | |
| 2006/0096275 A1 * | 5/2006 | Robel et al. | 60/286 |
| 2008/0010993 A1 | 1/2008 | Morgenstern | |
| 2008/0098985 A1 | 5/2008 | Kamio | |
| 2008/0141984 A1 | 6/2008 | Haga | |
| 2008/0221778 A1 | 9/2008 | Kakuho et al. | |
| 2008/0228375 A1 | 9/2008 | Ashida et al. | |
| 2008/0282998 A1 | 11/2008 | Kuzuoka et al. | |
| 2009/0017987 A1 | 1/2009 | Saton et al. | |
| 2009/0030588 A1 | 1/2009 | Yamashita | |
| 2009/0043479 A1 | 2/2009 | Noda et al. | |
| 2009/0065409 A1 | 3/2009 | Kamio et al. | |
| 2009/0071453 A1 | 3/2009 | Stockhausen et al. | |

OTHER PUBLICATIONS

Leone, Thomas G., et al. "Method for Operating and Engine with Variable Charge Density" U.S. Appl. No. 12/756,800, filed Apr. 8, 2010, 87 Pgs.

Leone, Thomas G., et al., "Pump Control for Reformate Fuel Storage Tank" U.S. Appl. No. 12/756,827, filed Apr. 8, 2010, 24 Pgs.

Czekala, Michael D., et al., "Ignition Control for Reformate Engine" U.S. Appl. No. 12/756,792, filed Apr. 8, 2010, 32 Pgs.

Pursifull, Ross D., "Engine Fuel Reformer Monitoring" U.S. Appl. No. 12/756,845, filed Apr. 8, 2010, 37 Pgs.

Gopichandra, Surnilla, et al., "Method for Improving Transient Engine Operation" U.S. Appl. No. 12/756,784, filed Apr. 8, 2010, 77 Pgs.

Leone, Thomas G., "Operating and Engine with Reformate" U.S. Appl. No. 12/756,883, filed Apr. 8, 2010, 48 Pgs.

Leone, Thomas G., et al., "Method for Operating a Vehicle with a Fuel Reformer" U.S. Appl. No. 12/756,892, filed Apr. 8, 2010, 86 Pgs.

Pursifull, Ross D., "Method for Operating an Engine" U.S. Appl. No. 12/756,809, filed Apr. 8, 2010, 87 Pgs.

Pursifull, Ross D., et al., "Selectively Storing Reformate" U.S. Appl. No. 12/756,853, filed Apr. 8, 2010, 33 Pgs.

Leone, Thomas G., "Reformate Control Via Accelerometer" U.S. Appl. No. 12/756,897, filed Apr. 8, 2010, 33 Pgs.

Kerns, James, et al., "Method for Operating an Engine with a Fuel Reformer" U.S. Appl. No. 12/756,858, filed Apr. 8, 2010, 33 Pgs.

Kamio, Junichi, et al., "Study on HCCI-SI Combustion Using Fuels Containing Ethanol", SAE Technical Paper Series No. 2007-01-4051, Powertrain & Fluid Systems, Conference & Exhibition, Rosemont, IL, Oct. 29-Nov. 1, 2007, 12 Pgs.

Hoffmann, Walter, et al., "A New Approach to Ethanol Utilization: High Efficiency and Low Nox in an Engine Operating on Simulated Reformed Ethanol", SAE Technical Paper Series No. 2008-01-2415, Powertrain, Fuels, & Lubricants Meeting, Rosemont, IL, Oct. 6-9, 2008, 11 Pgs.

Morgenstern, David A., et al., "Low Temperature Reforming of Ethanol over Copper-Plated Randy Nickel: A New Route to Sustainable Hydrogen for Transportation" revised manuscript received May 4, 2005, pp. 9.

Green Car Congress, "Honda Making Significant Progress on HCCI Engine for Hybrid Application" Oct. 28, 2009, http://www.greencarcongress.com/2005/10/honda_making_si.html, 8 Pgs.

* cited by examiner

FUEL INJECTOR DIAGNOSTIC FOR DUAL FUEL ENGINE

TECHNICAL FIELD

The present application relates to diagnosing injector variability in a fuel injection system in a dual fuel engine.

BACKGROUND AND SUMMARY

When new, fuel injectors may exhibit some piece-to-piece variability. Over time, injector performance may degrade (e.g., injector becomes clogged) which may further increase piece-to-piece injector variability. As a result, the actual amount of fuel injected to each cylinder of an engine may not be the desired amount and the difference between the actual and desired amounts may vary between injectors. Such discrepancies can lead to reduced fuel economy, increased tailpipe emissions, and an overall decrease in engine efficiency. Further, engines operating with a plurality of different injection substances, such as different fuel mixtures, may have even more fuel injectors (e.g., twice as many) resulting in a greater possibility for degradation of engine performance due to injector degradation.

The inventor herein has recognized the above problems and has devised an approach to at least partially address them. Thus, a method for controlling fuel injection of a dual multi-substance injection engine which includes first and second fuel rails and first and second fuel pumps is disclosed. The method comprises, suspending pumping of a second substance into the second fuel rail and injecting a first substance to all but a single cylinder of the engine, and, while pumping is suspended in the second fuel rail, injecting the second substance into the single cylinder and correlating pressure decrease in the second fuel rail to injector operation.

By suspending pumping in the second fuel rail, an injector can be isolated and pressure drops in the fuel rail can be correlated to the operation of the injector. Further, injection of the first fuel can continue without interruption in all but one of the cylinders. In this manner, each fuel injector can be isolated and tested without significantly affecting engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The following description relates to a method for controlling fuel injection in a multi-injection substance engine, such as a dual fuel engine, which includes first and second fuel rails and first and second fuel pumps. In one example, a diagnostic routine may be carried out in the following manner: pumping of a second fuel into the second fuel rail is suspended while a first fuel is injected to all but a single cylinder of the engine. Further, while pumping is suspended in the second fuel rail, the second fuel is injected into the single cylinder and the pressure decrease in the second fuel rail is correlated to injector operation. In this manner, a single injector may be isolated at one time allowing the injector to be tested without having a substantial impact on the performance of the engine. Furthermore, all injectors for both types of fuel can be tested in this manner. In another example, a sub-group of cylinders may be isolated together, rather than a single cylinder as noted above.

Figure 1:
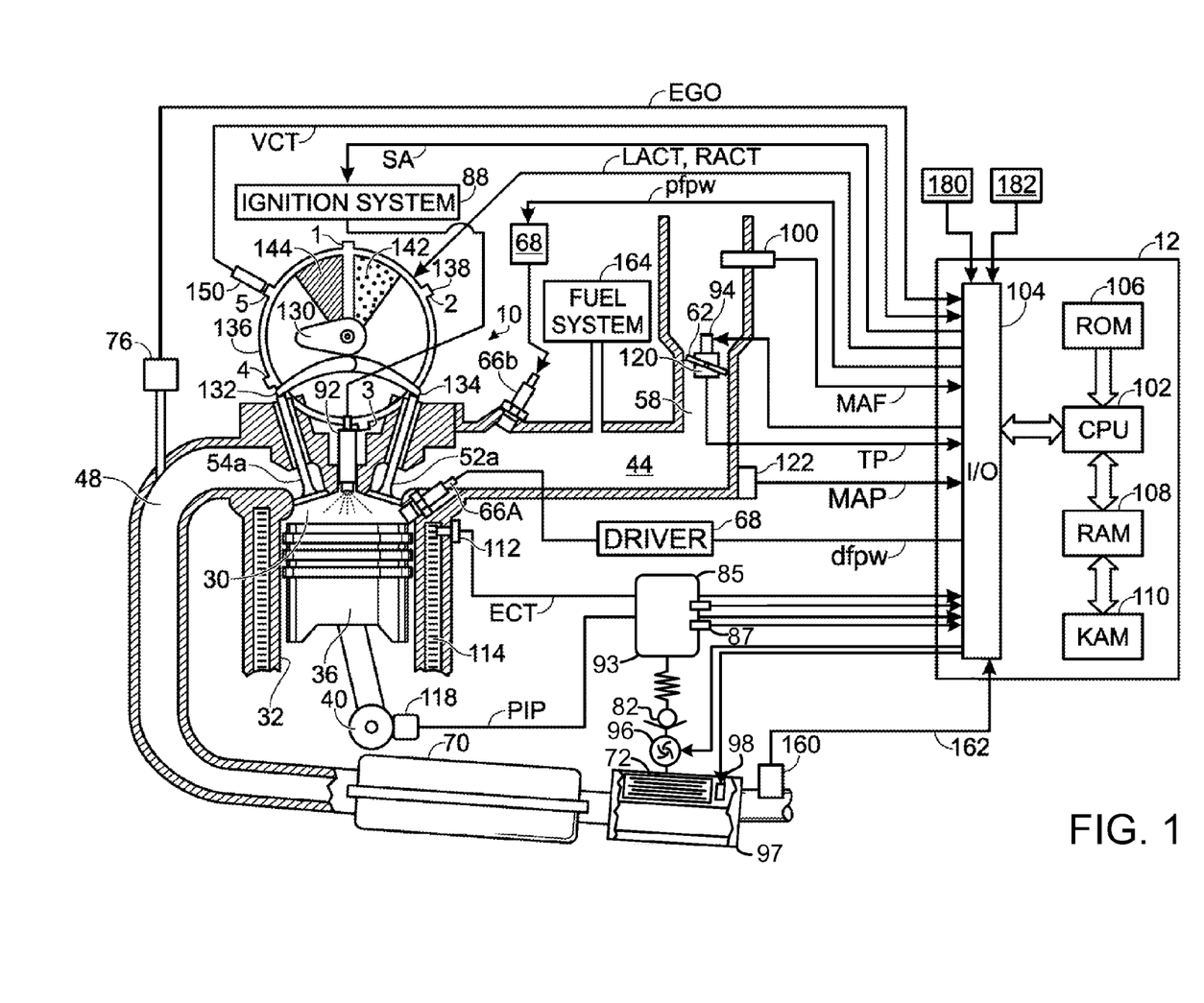
FIG. 1 shows a schematic diagram of an engine.

FIG. 1 shows one cylinder of a multi-cylinder engine, as well as the intake and exhaust path connected to that cylinder. In the embodiment shown in FIG. 1, engine 10 is capable of using two different substances, and/or two different injectors in one example. For example, engine 10 may use gasoline and an alcohol containing fuel such as ethanol, methanol, a mixture of gasoline and ethanol (e.g., E85 which is approximately 85% ethanol and 15% gasoline), a mixture of gasoline and methanol (e.g., M85 which is approximately 85% methanol and 15% gas), etc. Further, as another example, engine 10 may use one fuel or fuel blend (e.g., gasoline or gasoline and ethanol) and one mixture of water and fuel (e.g., water and methanol). As another example, engine 10 may use gasoline and a reformate fuel generated in a reformer coupled to the engine. In another example, two fuel systems are used, but each uses the same fuel, such as gasoline. In still another embodiment, a single injector (such as a direct injector) may be used to inject a mixture of gasoline and an alcohol based fuel, where the ratio of the two fuel quantities in the mixture may be adjusted by controller 12 via a mixing valve, for example. In still another example, two different injectors for each cylinder are used, such as port and direct injectors. In even another embodiment, different sized injectors, in addition to different locations and different fuels, may be used.

FIG. 1 shows one example fuel system with two fuel injectors per cylinder, for at least one cylinder. Further, each cylinder may have two fuel injectors. The two injectors may be configured in various locations, such as two port injectors, one port injector and one direct injector (as shown in FIG. 1), or others.

Continuing with FIG. 1, it shows a dual injection system, where engine 10 has both direct and port fuel injection, as well as spark ignition. Internal combustion engine 10, comprising a plurality of combustion chambers, is controlled by electronic engine controller 12. Combustion chamber 30 of engine 10 is shown including combustion chamber walls 32 with piston 36 positioned therein and connected to crankshaft 40. A starter motor (not shown) may be coupled to crankshaft 40 via a flywheel (not shown), or alternatively direct engine starting may be used.

In one particular example, piston 36 may include a recess or bowl (not shown) to help in forming stratified charges of air and fuel, if desired. However, in an alternative embodiment, a flat piston may be used.

Combustion chamber, or cylinder, 30 is shown communicating with intake manifold 44 and exhaust manifold 48 via respective intake valves 52a and 52b (not shown), and exhaust valves 54a and 54b (not shown). Thus, while four valves per cylinder may be used, in another example, a single intake and single exhaust valve per cylinder may also be used. In still another example, two intake valves and one exhaust valve per cylinder may be used.

Combustion chamber 30 can have a compression ratio, which is the ratio of volumes when piston 36 is at bottom center to top center. In one example, the compression ratio may be approximately 9:1. However, in some examples where different fuels are used, the compression ratio may be increased. For example, it may be between 10:1 and 11:1 or 11:1 and 12:1, or greater.

Fuel injector 66A is shown directly coupled to combustion chamber 30 for delivering injected fuel directly therein in proportion to the pulse width of signal dfpw received from controller 12 via electronic driver 68. While FIG. 1 shows injector 66A as a side injector, it may also be located overhead of the piston, such as near the position of spark plug 92. Such a position may improve mixing and combustion due to the lower volatility of some alcohol based fuels. Alternatively, the injector may be located overhead and near the intake valve to improve mixing.

Fuel may be delivered to fuel injector 66A by a high pressure fuel system (shown in FIG. 2) including a fuel tank, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tank (or tanks) may (each) have a pressure transducer providing a signal to controller 12.

Fuel injector 66B is shown coupled to intake manifold 44, rather than directly to cylinder 30. Fuel injector 66B delivers injected fuel in proportion to the pulse width of signal pfpw received from controller 12 via electronic driver 68. Note that a single driver 68 may be used for both fuel injection systems, or multiple drivers may be used. Fuel system 164 is also shown in schematic form delivering vapors to intake manifold 44.

Further, engine 10 may include fuel reformer 97 with storage tank 93 for supplying a gaseous fuel to one or both fuel injectors 66a and 66b. Gaseous fuel may be supplied to one or both fuel injectors from storage tank 93 by way of pump 96 and check valve 82. Pump 96 pressurizes gaseous fuel supplied from fuel reformer 97 in storage tank 93. Check valve 82 limits flow of gaseous fuel from storage tank 93 to fuel reformer 97 when the output of pump 96 is at a lower pressure than storage tank 93. In some embodiments, check valve 82 may be positioned upstream of pump 96. In other embodiments, check valve 82 may be positioned in parallel with pump 96. Further, check valve 82 may instead be an actively controlled valve. In such an embodiment, the actively controlled valve would be opened when the pump is operating. The control signal to pump 96 may be a simple on/off signal, for example. In other examples, the control signal may be a continuous variable voltage, current, pulsewidth, desired speed, or desired flowrate, etc. Further, pump 96 may be turned off, slowed down, or disabled with one or more bypass valves (not shown).

Fuel reformer 97 includes catalyst 72 and may further include optional electrical heater 98 for reforming alcohol supplied from fuel tank 91. Fuel reformer 97 is shown coupled to the exhaust system downstream of catalyst 70 and exhaust manifold 48. However, fuel reformer 97 may be coupled to exhaust manifold 48 and located upstream of catalyst 70. Fuel reformer 97 may use exhaust heat to drive an endothermic dehydrogenation of alcohol supplied by fuel tank 91 and to promote fuel reformation.

Intake manifold 44 is shown communicating with throttle body 58 via throttle plate 62. In this particular example, throttle plate 62 is coupled to electric motor 94 so that the position of elliptical throttle plate 62 is controlled by controller 12 via electric motor 94. This configuration may be referred to as electronic throttle control (ETC), which can also be utilized during idle speed control. In an alternative embodiment (not shown), a bypass air passageway is arranged in parallel with throttle plate 62 to control inducted airflow during idle speed control via an idle control by-pass valve positioned within the air passageway.

Exhaust gas sensor 76 is shown coupled to exhaust manifold 48 upstream of catalytic converter 70 (where sensor 76 can correspond to various different sensors). For example, sensor 76 may be any of many known sensors for providing an indication of exhaust gas air/fuel ratio such as a linear oxygen sensor, a UEGO, a two-state oxygen sensor, an EGO, a HEGO, or an HC or CO sensor. In this particular example, sensor 76 is a two-state oxygen sensor that provides signal EGO to controller 12 which converts signal EGO into two-state signal EGOS. A high voltage state of signal EGOS indicates exhaust gases are rich of stoichiometry and a low voltage state of signal EGOS indicates exhaust gases are lean of stoichiometry. Signal EGOS may be used to advantage during feedback air/fuel control to maintain average air/fuel at stoichiometry during a stoichiometric homogeneous mode of operation. Further details of air-fuel ratio control are included herein.

Distributorless ignition system 88 provides ignition spark to combustion chamber 30 via spark plug 92 in response to spark advance signal SA from controller 12.

Controller 12 may cause combustion chamber 30 to operate in a variety of combustion modes, including a homogeneous air/fuel mode and a stratified air/fuel mode by controlling injection timing, injection amounts, spray patterns, etc. Further, combined stratified and homogenous mixtures may be formed in the chamber. In one example, stratified layers may be formed by operating injector 66A during a compression stroke. In another example, a homogenous mixture may be formed by operating one or both of injectors 66A and 66B during an intake stroke (which may be open valve injection). In yet another example, a homogenous mixture may be formed by operating one or both of injectors 66A and 66B before an intake stroke (which may be closed valve injection). In still other examples, multiple injections from one or both of injectors 66A and 66B may be used during one or more strokes (e.g., intake, compression, exhaust, etc.). Even further examples may be where different injection timings and mixture formations are used under different conditions, as described below.

Controller 12 can control the amount of fuel delivered by fuel injectors 66A and 66B so that the homogeneous, stratified, or combined homogenous/stratified air/fuel mixture in chamber 30 can be selected to be at stoichiometry, a value rich of stoichiometry, or a value lean of stoichiometry.

Controller 12 is shown as a microcomputer, including microprocessor unit 102, input/output ports 104, an electronic storage medium for executable programs and calibration values shown as read only memory chip 106 in this particular example, random access memory 108, keep alive memory 110, and a conventional data bus. Controller 12 is shown receiving various signals from sensors coupled to engine 10, in addition to those signals previously discussed, including measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40; and throttle position TP from throttle position sensor 120; absolute Manifold Pressure Signal MAP from sensor 122; an indication of knock from knock sensor 182; and an indication of absolute or relative ambient humidity from sensor 180. Engine speed signal RPM is generated by controller 12 from signal PIP in a conventional manner and manifold pressure signal MAP from a manifold pressure sensor provides an indication of vacuum, or pressure, in the intake manifold. During stoichiometric operation, this sensor can give an indication of engine load. Further, this sensor, along with engine speed, can provide an estimate of charge (including air) inducted into the cylinder. In a one example, sensor 118, which is also used as an engine speed sensor, produces a predetermined number of equally spaced pulses every revolution of the crankshaft.

Continuing with FIG. 1, a variable camshaft timing system is shown. Specifically, camshaft 130 of engine 10 is shown communicating with rocker arms 132 and 134 for actuating intake valves 52a, 52b and exhaust valves 54a, 54b. Camshaft 130 is directly coupled to housing 136. Housing 136 forms a toothed wheel having a plurality of teeth 138. Housing 136 is hydraulically coupled to crankshaft 40 via a timing chain or belt (not shown). Therefore, housing 136 and camshaft 130 rotate at a speed substantially equivalent to the crankshaft. However, by manipulation of the hydraulic coupling as will be described later herein, the relative position of camshaft 130 to crankshaft 40 can be varied by hydraulic pressures in advance chamber 142 and retard chamber 144. By allowing high pressure hydraulic fluid to enter advance chamber 142, the relative relationship between camshaft 130 and crankshaft 40 is advanced. Thus, intake valves 52a, 52b and exhaust valves 54a, 54b open and close at a time earlier than normal relative to crankshaft 40. Similarly, by allowing high pressure hydraulic fluid to enter retard chamber 144, the relative relationship between camshaft 130 and crankshaft 40 is retarded. Thus, intake valves 52a, 52b, and exhaust valves 54a, 54b open and close at a time later than normal relative to crankshaft 40.

Continuing with the variable cam timing system, teeth 138, being coupled to housing 136 and camshaft 130, allow for measurement of relative cam position via cam timing sensor 150 providing signal VCT to controller 12. Teeth 1, 2, 3, and 4 are preferably used for measurement of cam timing and are equally spaced (for example, in a V-8 dual bank engine, spaced 90 degrees apart from one another) while tooth 5 is preferably used for cylinder identification. In addition, controller 12 sends control signals (LACT, RACT) to conventional solenoid valves (not shown) to control the flow of hydraulic fluid either into advance chamber 142, retard chamber 144, or neither.

Relative cam timing can be measured in a variety of ways. In general terms, the time, or rotation angle, between the rising edge of the PIP signal and receiving a signal from one of the plurality of teeth 138 on housing 136 gives a measure of the relative cam timing. For the particular example of a V-8 engine, with two cylinder banks and a five-toothed wheel, a measure of cam timing for a particular bank is received four times per revolution, with the extra signal used for cylinder identification.

Sensor 160 may also provide an indication of oxygen concentration in the exhaust gas via signal 162, which provides controller 12 a voltage indicative of the 02 concentration. For example, sensor 160 can be a HEGO, UEGO, EGO, or other type of exhaust gas sensor. Also note that, as described above with regard to sensor 76, sensor 160 can correspond to various different sensors.

As described above, FIG. 1 merely shows one cylinder of a multi-cylinder engine, and that each cylinder has its own set of intake/exhaust valves, fuel injectors, spark plugs, etc.

Also, in the example embodiments described herein, the engine may be coupled to a starter motor (not shown) for starting the engine. The starter motor may be powered when the driver turns a key in the ignition switch on the steering column, for example. The starter is disengaged after engine starting, for example, by engine 10 reaching a predetermined speed after a predetermined time. Further, in the disclosed embodiments, an exhaust gas recirculation (EGR) system may be used to route a desired portion of exhaust gas from exhaust manifold 48 to intake manifold 44 via an EGR valve (not shown). Alternatively, a portion of combustion gases may be retained in the combustion chambers by controlling exhaust valve timing.

Figure 2:
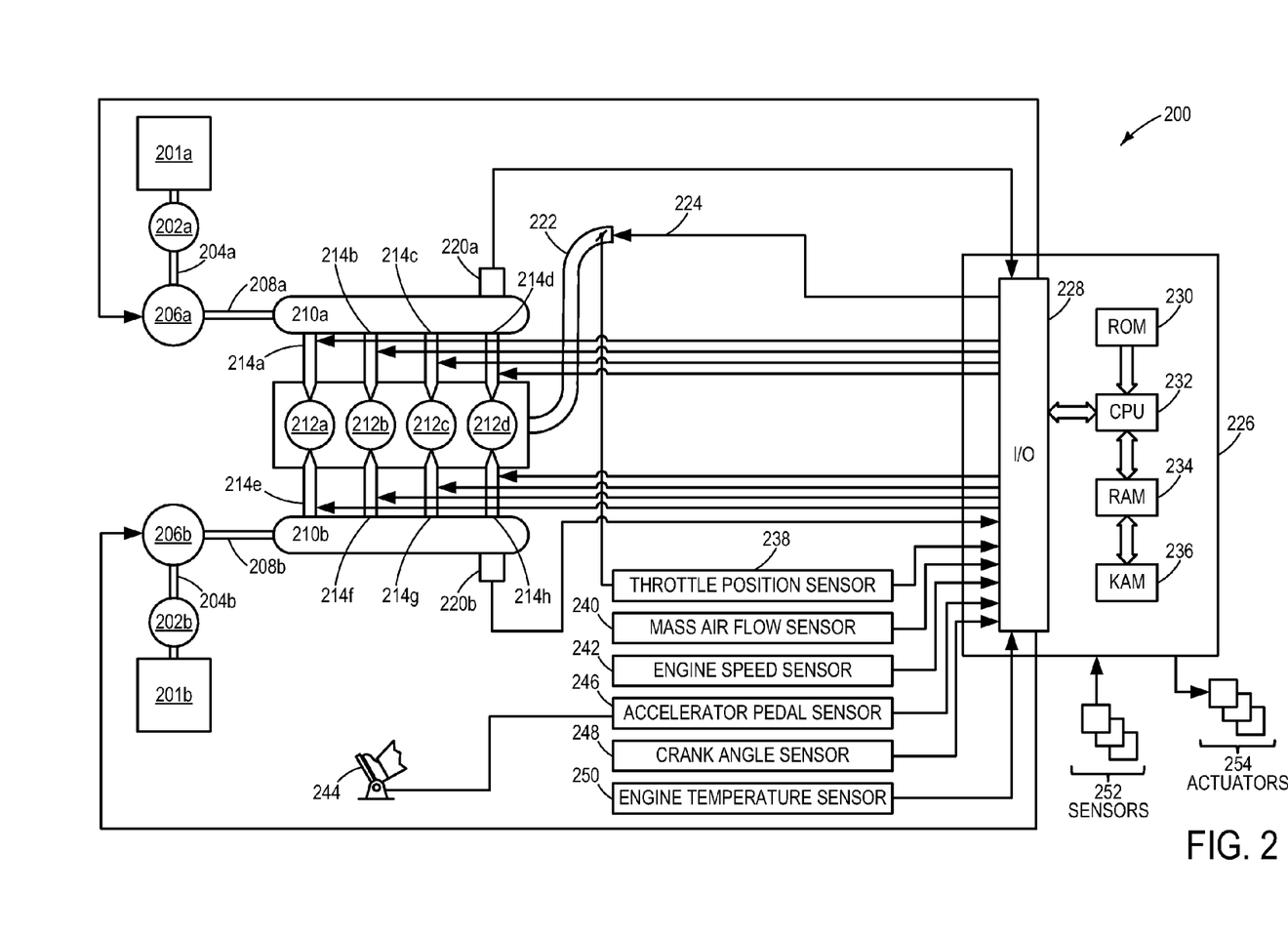
FIG. 2 shows a schematic diagram of a dual fuel system.

FIG. 2 illustrates a fuel injection system 200 with a high pressure dual fuel rail system which may be the fuel system coupled to engine 10 in FIG. 1, for example. The system 200 may include fuel tanks 201a and 201b, low pressure (or lift) fuel pumps 202a and 202b that supply fuel from the fuel tanks 201a and 201b to high pressure fuel pumps 206a and 206b via low pressure passages 204a and 204b, respectively. The high pressure fuel pumps 206a and 206b supply pressurized fuel to the high pressure fuel rails 210a and 210b via high pressure passages 208a and 208b, respectively. The high pressure fuel rail 210a supplies pressurized fuel to fuel injectors 214a, 214b, 214c, and 214d and the high pressure fuel rail 210b supplies pressurized fuel to fuel injectors 214e, 214f, 214g, and 214h. The fuel injectors inject fuels into engine cylinders 212a, 212b, 212c, and 212d located in an engine block 216. Un-injected fuel may be returned to the fuel tanks 201a and 201b via respective fuel return passages (not shown). The engine block 216 may be coupled to an intake pathway 222 with an intake air throttle 224.

The system may further include a control unit 226. Similar to control unit 12 in FIG. 1, the control unit may be further coupled to various other sensors 252 and various actuators 254 (e.g., fuel injection actuator, spark ignition actuator, throttle valve actuator, etc) for sensing and controlling vehicle operating conditions. For example, the control unit 226 may sense engine speed, throttle position, intake temperature and/or pressure, exhaust temperature/pressure, mass air flow, engine coolant temperature, crank angle position, variable cam position, injection timing, spark ignition timing through appropriate sensors. The control unit 226 may also control operations of intake and/or exhaust valves or throttles, engine cooling fan, spark ignition, injector, and fuel pumps to control engine operating conditions.

FIG. 2 shows additional details of the fuel injection system. Specifically, FIG. 2 shows control unit 226, which may be an engine control unit, powertrain control unit, control system, a separate unit, or combinations of various control units. The control unit 226 is shown in FIG. 2 as a microcomputer, including an input/output (I/O) port 228, a central processing unit (CPU) 232, an electronic storage medium for executable programs and calibration values shown as read only memory (ROM) chip 230 in this particular example, random access memory (RAM) 234, keep alive memory (KAM) 136, and a data bus.

The control unit 226 may receive signals from various sensors. For example, the control unit 226 may receive fuel pressure signals from the high pressure fuel rails 210a and 210b via respective fuel pressure sensors 220a and 220b located in the high pressure fuel rails 210a and 210b. The control unit may further receive throttle opening angle signals ($O_A$) indicating the intake air throttle position via a throttle position sensor 238, intake air flow signals ($Q_a$) from a mass air flow sensor 240, engine speed signals ($N_e$) from engine speed sensor 242, accelerator pedal position signal from a pedal 244 via an accelerator pedal position sensor 246, crank angle sensor 248, and engine coolant temperature (ECT) signals from engine temperature sensor 250.

In addition to the signals mentioned above, the control unit 226 may also receive other signals from various other sensors 252. For example, the control unit 226 may receive a profile ignition pickup signal (PIP) from a Hall effect sensor (not shown) coupled to a crankshaft and a manifold pressure signal MAP from a manifold pressure sensor, as shown in FIG. 1.

The control unit 226 may control operations of various vehicular components via various actuators 254. For example, the control unit 226 may control the operation of the fuel injectors 214a-h through respective fuel injector actuators (not shown) and high pressure fuel pumps 206a and 206b through respective high pressure fuel pump actuators (not shown).

The high pressure fuel pumps 206a and 206b may be coupled to and controlled by the control unit 226 as is shown in FIG. 2. The control unit 226 may regulate the amount or speed of fuel to be fed into the high pressure rails 210a and 210b by the high pressure fuel pumps 206a and 206b through respective high pressure fuel pump controls (not shown). The control unit 226 may also completely stop fuel supply to the high pressure fuel rails 210a and 210b. Furthermore, the high pressure fuel pumps 206a and 206b may contain one or more relief valves that decrease the fuel pressure in the high pressure fuel rails when the fuel pressure in the high pressure fuel rails 210a and 210b is higher than desired.

Although the injectors are coupled to engine cylinders in this example, in other examples, the injectors may be coupled to an intake pathway. The fuel injectors that are directly coupled to engine cylinders may be located overhead of cylinder pistons (not shown) or located on the side of an engine cylinder. The injectors 214a-h may be operatively coupled to and controlled by a control unit, such as the control unit 226, as is shown in FIG. 2. An amount of fuel injected from the injector and the injection timing may be determined by the control unit 226 from an engine map stored in the control unit 226 on the basis of engine speed ($N_e$) and/or intake throttle angle ($Q_A$), or engine load. The injector may be controlled via controlling an electromagnetic valve coupled to the injector (not shown). The injector may not inject all the fuel supplied to the injector and may return part of the fuel supplied to the fuel tank through a return path, such as a return passage (not shown).

The high pressure fuel rails 210a and 210b may also contain one or more temperature sensors for sensing the fuel temperature in the high pressure fuel rails 210a and 210b and one or more pressure sensors for sensing the fuel pressure in the high pressure fuel rails 210a and 210b. They may also contain one or more relief valves that when opened decrease the pressure in the high pressure fuel rails when it is greater than desired and return extra fuel back to the fuel tank via a fuel return passage.

Various other modifications or adjustments may be made to the above example systems. For example, the fuel passages (e.g., 204a, 204b, 208a, and 208b) may contain one or more filters, pumps, pressure sensors, temperature sensors, and/or relief valves. The fuel passages may include one or multiple lines. There may be one or more fuel cooling systems. The intake pathway 222 may contain one or more air filters, turbochargers, and/or surge tanks. The engine may contain one or more engine cooling fans, cooling circuits, spark ignitions, valves, and controls. The engine may be coupled to an exhaust pathway.

Figure 3:
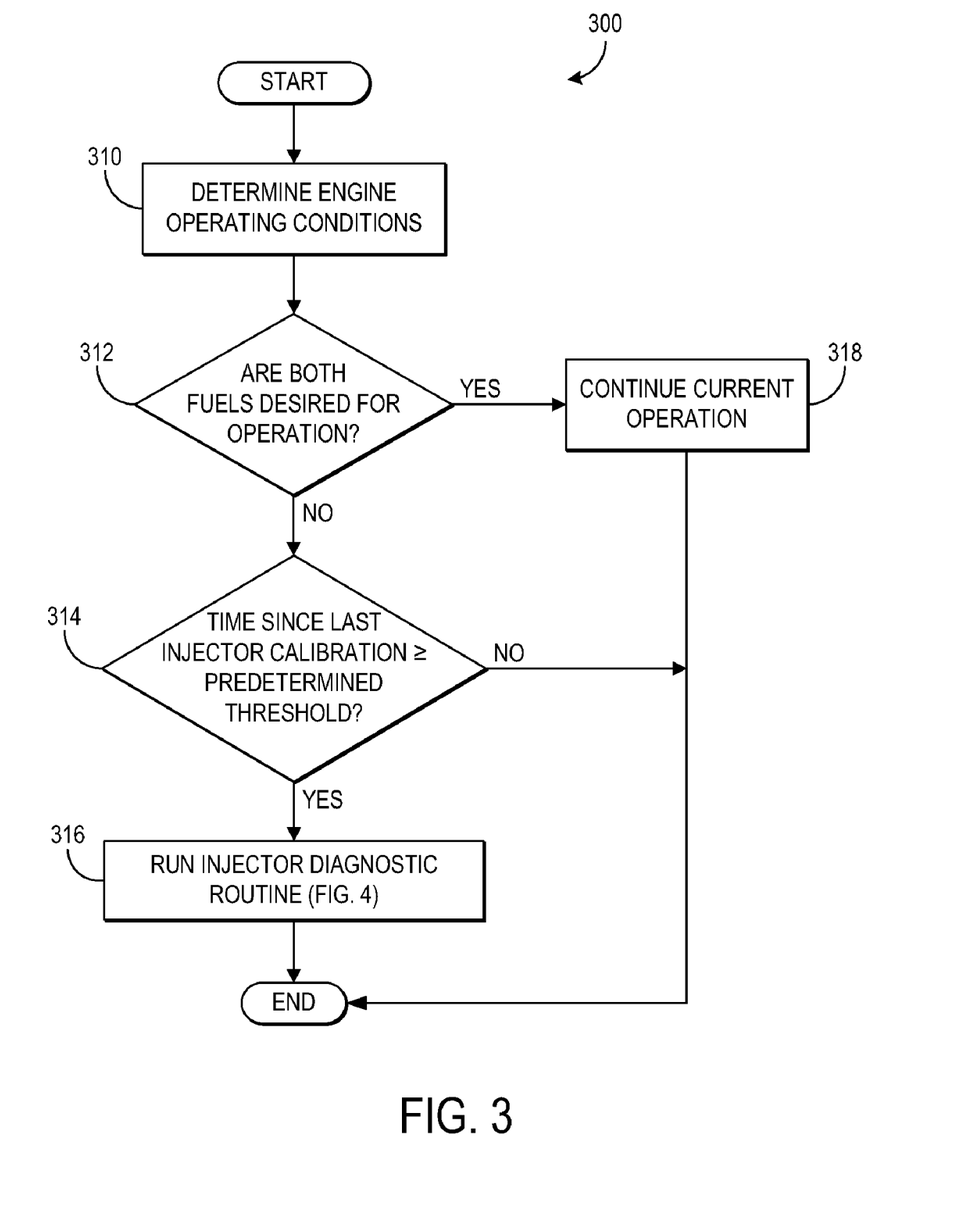
FIG. 3 shows a flow chart illustrating a routine for
FIG. 4 shows a flow chart illustrating an example fuel injector diagnostic routine.

Continuing to FIG. 3, a routine 300 for determining if a diagnostic routine should be run is illustrated. Specifically, routine 300 determines if a diagnostic routine is desired based on which fuels are desired for engine operation and an amount of time since the last injector calibration. For example, during conditions in which both fuels are needed, a diagnostic routine may not be run since injection of one of the fuels is suspended one of the cylinders.

At 310 of routine 300, engine operating conditions are determined. Engine operating conditions may include load, temperature, speed, etc.

Once the engine operation conditions are determined, routine 300 proceeds to 312 where it is determined if both fuels are desired for engine operation. For example, if the engine is operating at high load, injection of both fuels may be desired in order to continue operating at high load. As another example, the engine may be operating under low load conditions and the engine may operate using one or both fuels.

If it is determined that both fuels are desired, routine 300 moves to 318 and the current engine operation is continued and the routine ends. On the other hand, if it is determined that both fuels are not desired for operation (e.g., one or both fuels may be used, but both fuels are not needed for optimum engine efficiency), routine 300 continues to 314 where it is determined if the time since the last injector calibration is greater than or equal to a predetermined threshold. As examples, injector calibration may be desired one or more times per drive cycle, every other drive cycle, or after a predetermined number of miles is driven.

If the time since the last injector calibration is not greater than or equal to the predetermined threshold, routine 300 ends. In contrast, if the time since the last injector calibration is greater than or equal to the predetermined threshold, routine 300 proceeds to 316 and an injector diagnostic routine is carried out, as will be described below with reference to FIG. 4.

Figure 4:
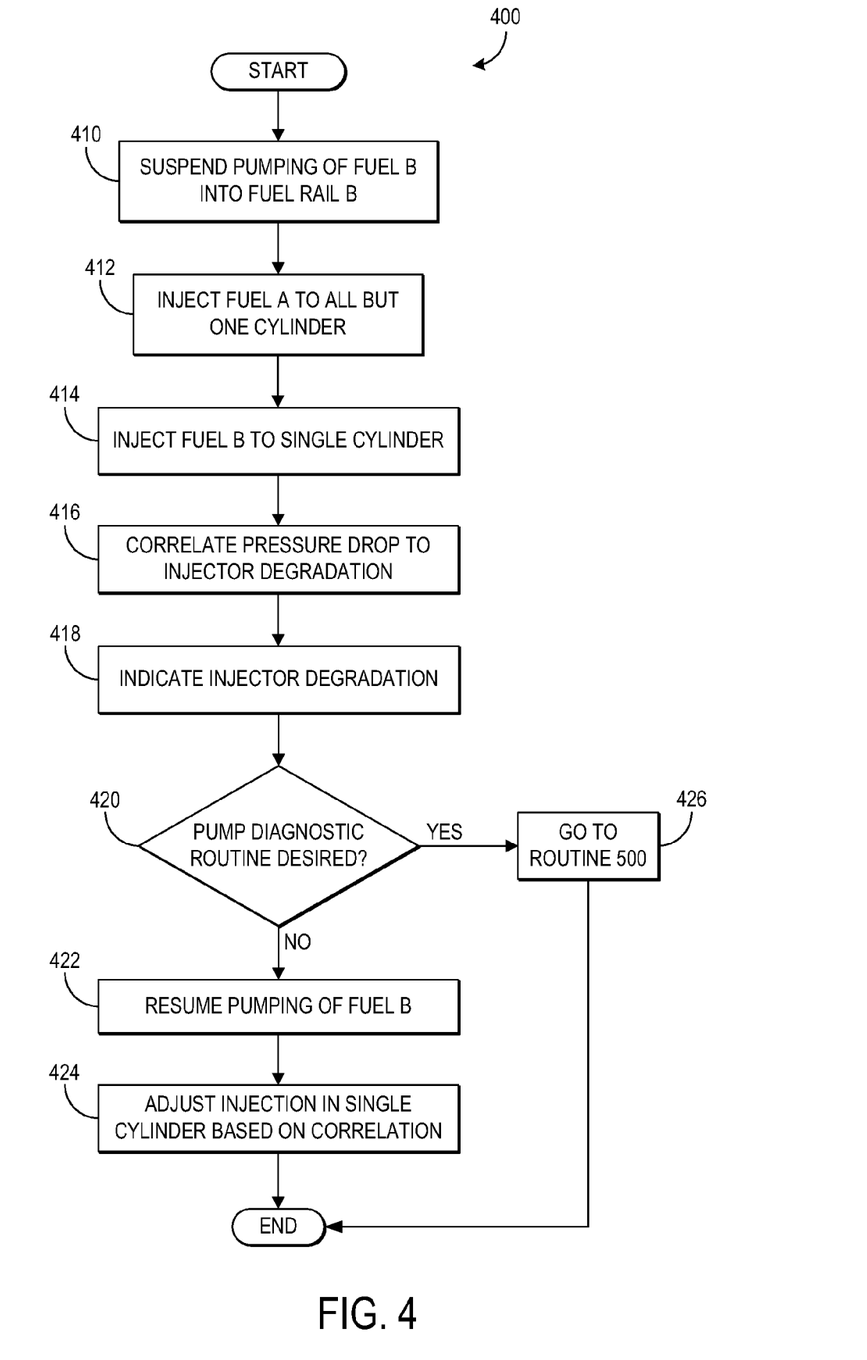

Continuing to FIG. 4, a diagnostic routine 400 for fuel injectors is illustrated. Specifically, routine 400 suspends the pumping of fuel into one of the fuel rails and fuel is injected to a single cylinder or a group of cylinders at a time in order to detect a pressure drop due to the injection. As such, the other fuel rail pump may continue to supply fuel to the other fuel rail and other cylinders of the engine and the diagnostic routine may be carried out using one injector at a time thereby maintaining engine efficiency.

At 410 of routine 400, pumping of fuel B is suspended in fuel rail B. For example, in a dual fuel system, the fuel system may include a first fuel rail (e.g., fuel rail A) coupled to a first fuel pump (e.g., fuel pump A) which pumps a first fuel (e.g., fuel A) into the first fuel rail and a second fuel rail (e.g., fuel rail B) coupled to a second fuel pump (e.g., fuel pump B) which pumps a second fuel (e.g., fuel B) into the second fuel rail. Fuel A and fuel B may be various fuels such as gasoline, ethanol, a gaseous reformate fuel, a blend of gasoline and an alcohol based fuel, a mixture of fuel and water, etc.

After the pumping of fuel B is suspended in fuel rail B, injection of fuel A is carried out in all but one of the cylinders of the engine at 412 of routine 400. For example, if pumping of fuel B is suspended in fuel rail B, fuel A is injected to all but a single cylinder. As an example, in a four cylinder engine, fuel A may be injected to cylinders 2, 3, and 4, but not cylinder 1. In some embodiments, injection of fuel A may be suspended in a group of cylinders instead of a single cylinder, for example, fuel A may be injected to cylinders 1, 2, and 3 and not cylinders 4, 5, and 6 in a six cylinder engine example.

Figure 6A:
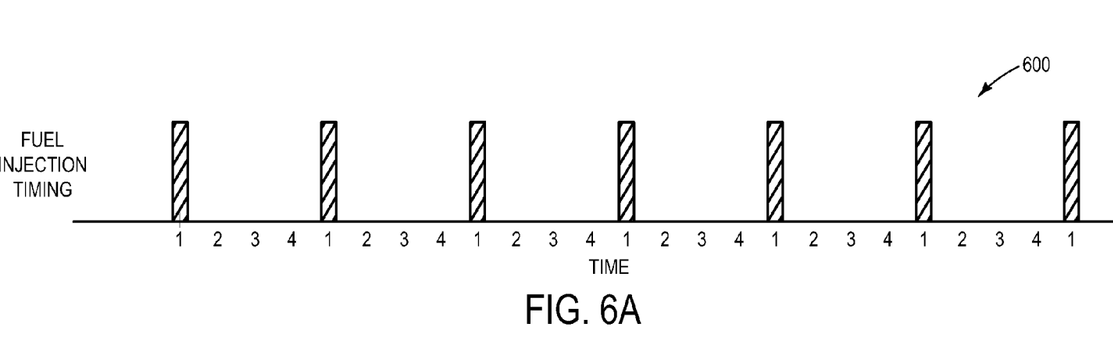
FIGS. 6A and 6B show an example fuel injection timing and fuel pressure change during a diagnostic routine.
Figure 7A:
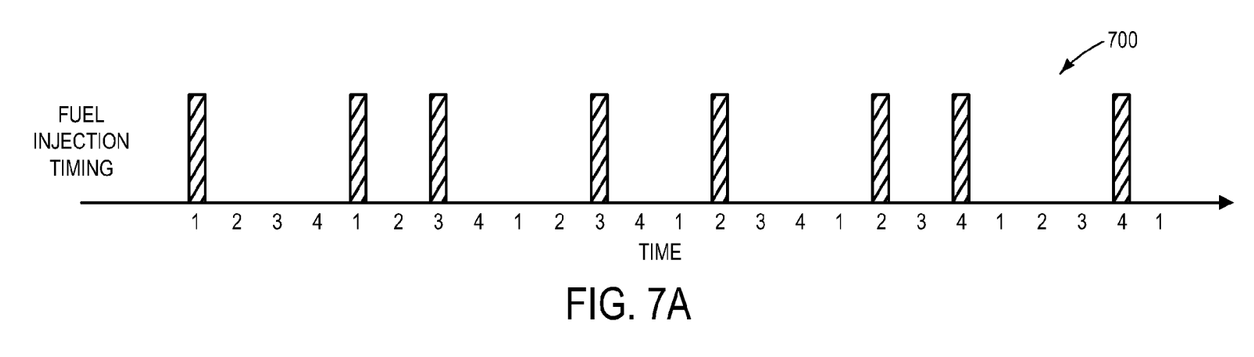
FIGS. 7A and 7B show another example of fuel injection timing and fuel pressure change during a diagnostic routine.

Next, while the pumping of fuel B is suspended in fuel rail B and the injection of fuel A is carried out in all but a single cylinder of the engine, fuel B is injected to the single cylinder at 414 of routine 400. In some examples, fuel B may be injected to the single cylinder in a predetermined sequence for a predetermined number of times. For example, FIG. 6A shows an example in which only one injector is fired in a sequence. In other examples, fuel B may be injected to more than one cylinder (but only one cylinder at a time) in a predetermined sequence. As an example, FIG. 7A shows an example in which four different injectors are fired at different times in a sequence.

Because pumping has been suspended in fuel rail B, the amount of fuel, and thus the pressure, decreases with each injection, thus the pressure drop due to the injection of fuel in the single cylinder can be correlated to injector degradation at 416 of routine 400 and injector degradation is indicated at 418 of routine 400. For example, if the change in pressure (e.g., pressure drop) is lower than expected, the injector may be partially plugged and less fuel is injected than desired. In another example, if the pressure drop is lower than expected at small pulse widths (e.g., a short amount of time between each injection in the sequence), the injector may be slow to open and less fuel is injected than desired. In yet another example, if the pressure drop is higher than expected, the injector may be stuck open and more fuel is injected than desired. As another example, if the pressure drop is higher than expected at small pulse widths, the injector may be slow to close and more fuel is injected than desired.

At 420, it is determined if a pump diagnostic routine is desired. As with the injector diagnostic routine, it may be desired to run a pump diagnostic routine at predetermined intervals, for example, one or more times per drive cycle or after a predetermined number of miles are driven. If it is determined that a pump diagnostic routine is desired, routine 400 moves to 426 and routine 500 (e.g., a pump diagnostic routine) of FIG. 5 commences.

On the other hand, if it is determined that a pump diagnostic routine is not desired, routine 400 proceeds to 422 and pumping of fuel B into fuel rail B is resumed. Next, at 424, the amount of fuel injected to the single cylinder by the injector is adjusted based on the correlation. For example, if the amount of fuel injected by an injector is more than desired, the injector is calibrated such that less fuel is injected per injection (e.g., the injection is compensated by a correction coefficient) in order to compensate for the injector degradation and maintain the efficiency of the system.

Figure 5:
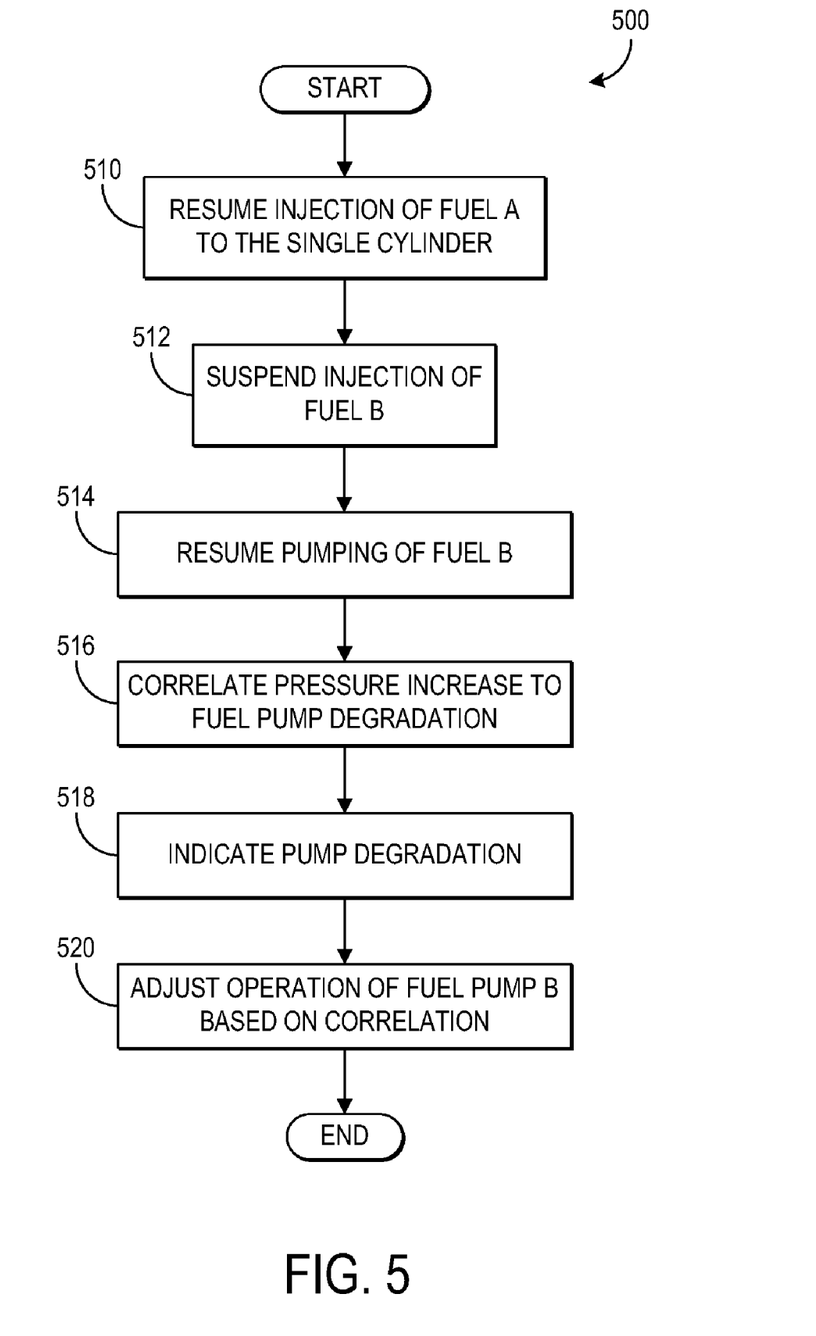
FIG. 5 shows a flow chart illustrating an example fuel pump diagnostic routine.

Continuing to FIG. 5, a pump diagnostic routine 500 is shown. Specifically, routine 500 suspends injection in one of the fuel rails while pumping in the fuel rail is resumed (or continues). In this manner, pressure increase in the fuel rail can be correlated to the operation of the pump and pump degradation can be indicated. In this embodiment, the pump diagnostic routine is carried out after the injector diagnostic routine when the pressure in the fuel has decreased a known amount. However, in other embodiments, the pump diagnostic routine may be carried out before the injector diagnostic routine or independent of the injector diagnostic routine.

At 510 of routine 500, injection of fuel A is resumed in the single cylinder. Next, at 512, injection of fuel B is suspended in the single cylinder. As such, all cylinders receive only fuel A during the pump diagnostic routine.

Once injection of fuel B is suspended, pumping of fuel B into fuel rail B is resumed at 514 of routine 500. Next, at 516, pressure increase in fuel rail B is correlated to fuel pump degradation and then pump degradation is indicated at 518 of routine 500. For example, if the pressure increase in the fuel rail deviates from a predetermined or expected value, degradation is indicated. As an example, if pressure increase is less than expected, a fuel filter coupled to the fuel pump may be clogged or the pump may be leaking.

After fuel pump degradation is correlated to the pressure increase in the fuel rail, routine 500 continues to 520 where operation of fuel pump B is adjusted based on the correlation. For example, a calibration coefficient may be calculated and if the pump is pumping less fuel than desired into the fuel rail per pump stroke, pump operation may be adjusted by the calibration coefficient such that more fuel is pumped into the fuel rail per pump stroke. Further, a diagnostic code may be sent to the engine controller indicating degradation of the pump and the need for service, for example.

Figure 6B:
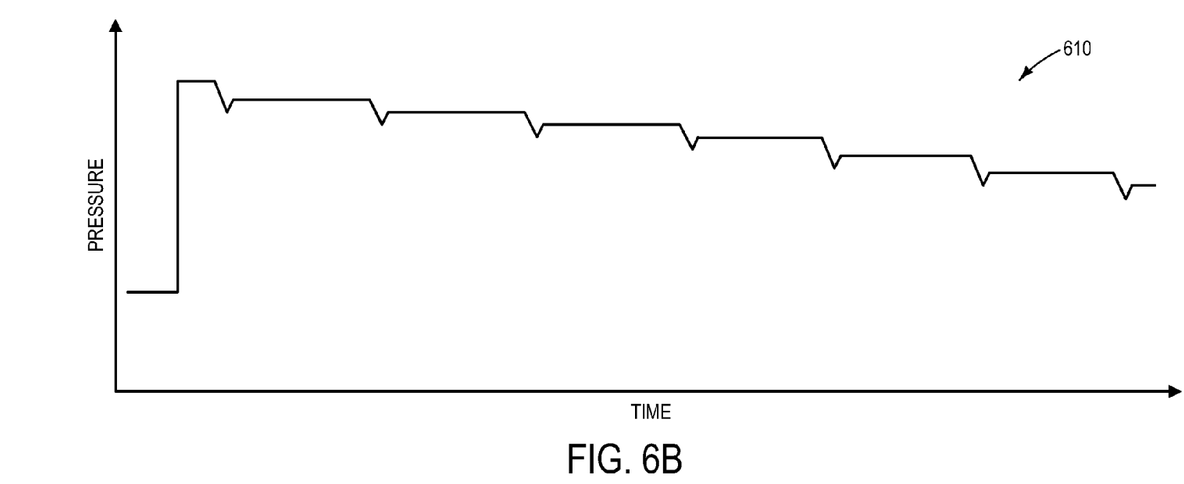

FIGS. 6A and 6B show an example of fuel injection timing 600 and corresponding fuel pressure change 610 in a fuel rail during an injector diagnostic routine in a four cylinder engine. In the example of FIGS. 6A and 6B only one injector is tested during the injector diagnostic routine. Prior to an injector diagnostic routine, the fuel pressure in the fuel rail is maintained at a normal operating pressure and normal pump strokes are issued. In some embodiments, as shown at 610, at the start of the injector diagnostic routine, fuel pressure in the fuel rail is increased (e.g., via more or larger pump strokes) before pumping is suspended. As shown, for each injection, the pressure in the fuel rail drops.

Figure 7B:
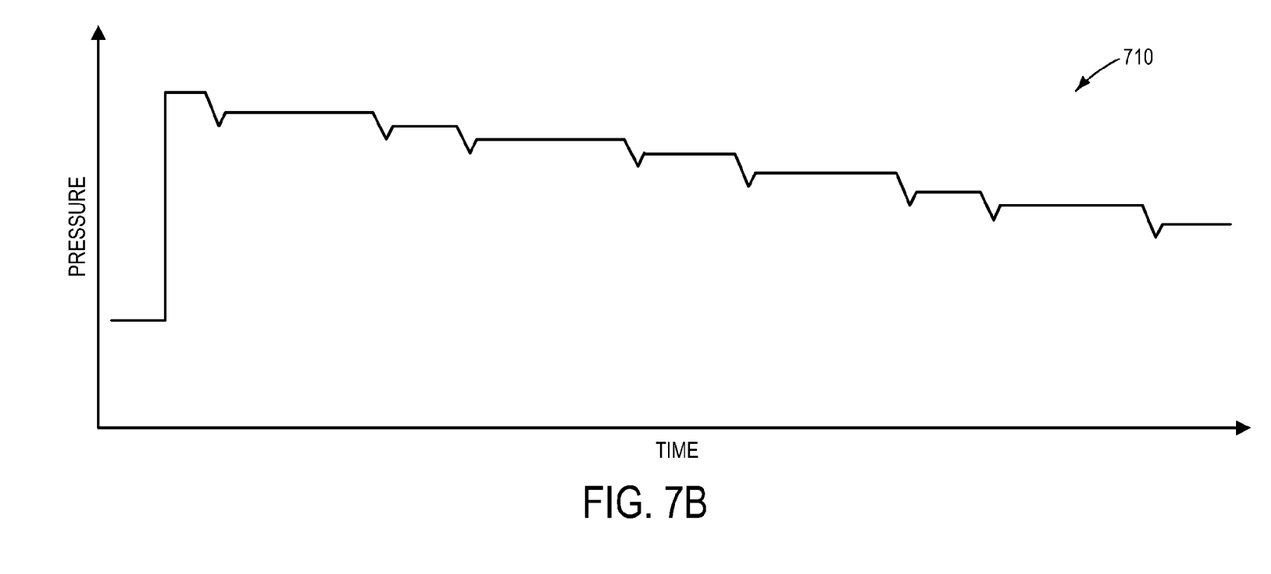

FIGS. 7A and 7B show another example of fuel injection timing 700 and corresponding fuel pressure change 710 during an injector diagnostic routine. In the example of FIGS. 7A and 7B, multiple injectors are tested during the injector diagnostic routine in a four cylinder engine. In the sequence shown at 700, all four injector are fired at different times and the corresponding fuel pressure profile 710 may be used to calculate a correction coefficient for each injector.

Thus, during engine operating conditions in which both fuels are not desired for operation (e.g., one or both fuels may be used), pumping may be suspended in one of the fuel rails allowing its injectors to be isolated for testing. Further, operation of the corresponding fuel pump may be subsequently assessed. As such, diagnostic routines for the fuel injectors and fuel pumps may be carried out without significantly interfering with engine operation.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

Such claims, whether broader, narrower, equal, or different in scope to the original claims, also are regarded as included within the subject matter of the present disclosure.

The invention claimed is:

1. A method for controlling fuel injection of a multi-substance injection engine which includes first and second rails and first and second pumps, comprising:
   suspending pumping of a second substance into the second rail while injecting a first substance to all but a single cylinder of the engine; and
   while pumping is suspended in the second rail, injecting the second substance into the single cylinder and correlating pressure decrease in the second rail to injector degradation.

2. The method of claim 1, wherein injector degradation is indicated when the pressure decrease is less than a predetermined value.

3. The method of claim 1, wherein injector degradation is indicated when the pressure decrease is greater than a predetermined value.

4. The method of claim 1, further comprising:
   resuming injection of the first substance to the single cylinder and suspending injection of the second substance; and
   while injection of the second substance is suspended, resuming pumping of the second substance to the second rail and correlating pressure increase in the second rail to operation of the second pump.

5. The method of claim 4, wherein degradation of the second pump is indicated when the pressure increase deviates from a predetermined value.

6. The method of claim 1, wherein each fuel injector of each cylinder of a plurality of engine cylinders is sequentially isolated to generate respective correlations for each injector.

7. The method of claim 1, wherein the second substance is injected to the single cylinder through a predetermined number of injections.

8. A method for controlling fuel injection of a dual fuel engine which includes first and second fuel rails and first and second fuel pumps, comprising:
   suspending pumping of a second fuel into the second fuel rail while injecting a first fuel to all but a first group of cylinders of the engine;
   while pumping is suspended in the second fuel rail, injecting the second fuel into the first group of cylinders, and correlating pressure decrease in the second fuel rail to injector degradation; and
   adjusting fuel injection of the second fuel in the first group of cylinders based on the correlation once pumping of the second fuel is resumed by the second pump.

9. The method of claim 8, wherein injector degradation is indicated when the pressure decrease deviates from a predetermined value, and wherein the first group of cylinders is a single cylinder.

10. The method of claim 8, further comprising:
    resuming injection of the first fuel to the first group of cylinders and suspending injection of the second fuel;
    while injection of the second fuel is suspended, resuming pumping of the second fuel to the second fuel rail and correlating pressure increase in the second fuel rail to operation of the second fuel pump; and
    adjusting operation of the second fuel pump based on the correlation of pressure increase and pump operation.

11. The method of claim 10, wherein pump degradation is indicated when the pressure deviates from a predetermined value.

12. The method of claim 8, wherein the first fuel is gasoline and the second fuel is ethanol.

13. A system for an engine in a vehicle, comprising:
    a plurality of cylinders, each cylinder having a first and second injector where the first injector is coupled to a first fuel rail and the second injector is coupled to a second fuel rail; and
    a control system comprising a computer readable storage medium, the medium comprising instructions for:
      during a first condition, injecting fuel to all cylinders via the first injectors; and
      during a second condition:
        injecting fuel to all but one cylinder via the first injectors, and injecting fuel to the one cylinder via only the second injectors; and
        suspending pumping of fuel into the second fuel rail while continuing pumping of fuel into the first fuel rail.

14. The system of claim 13, wherein the first injectors inject a first fuel and the second injectors inject a second fuel.

15. The system of claim 14, wherein the first condition includes operating conditions in which only one fuel is used and a diagnostic routine is not being carried out.

16. The system of claim 14, wherein the second condition includes operating conditions in which both fuels are used and a diagnostic routine is being carried out.

17. The system of claim 14, further comprising instructions for, during a third condition, injecting all cylinders via the first and second injectors.

18. The system of claim 17, wherein the third condition includes operating conditions in which both fuels are used.

19. The system of claim 13, further comprising, during the second condition and while pumping is suspended in the second fuel rail, correlating pressure decrease in the second fuel rail to injector operation.

20. The system of claim 19, wherein injector degradation is indicated when the pressure decrease deviates from a predetermined value.

* * * * *